United States Patent [19]

Hamada et al.

[11] Patent Number: 4,550,948
[45] Date of Patent: Nov. 5, 1985

[54] REINFORCED SIDE DOOR SUPPORT STRUCTURE

[75] Inventors: Makoto Hamada, Toyota; Junji Hasegawa; Kuniaki Oosaka, both of Susono, all of Japan

[73] Assignee: Toyota Jidosha Kabushiki Kaisha, Japan

[21] Appl. No.: 531,253

[22] Filed: Sep. 12, 1983

[51] Int. Cl.⁴ .............................................. B62D 27/02
[52] U.S. Cl. .................... 296/202; 296/209; 296/30
[58] Field of Search ............... 296/185, 202, 203, 194, 296/209, 29, 30, 187, 193

[56] References Cited

U.S. PATENT DOCUMENTS

| | | | |
|---|---|---|---|
| 3,528,699 | 9/1970 | Wessells, III | 296/209 |
| 4,252,364 | 2/1981 | Toyama et al. | 296/185 |
| 4,471,992 | 9/1984 | Matsuura et al. | 296/209 |

FOREIGN PATENT DOCUMENTS

| | | | |
|---|---|---|---|
| 2754642 | 6/1979 | Fed. Rep. of Germany | 296/202 |
| 52-85125 | 6/1977 | Japan . | |
| 0036769 | 3/1983 | Japan | 296/202 |

*Primary Examiner*—Randolph A. Reese
*Assistant Examiner*—Russell D. Stormer
*Attorney, Agent, or Firm*—Parkhurst & Oliff

[57] ABSTRACT

A vehicle body structure which increases the rigidity of a side door supporting mechanism which is defined by a vertical supporting pillar and a horizontal rocker panel. The structure has a reinforcement member which is sandwiched between a lower portion of an outer pillar panel and an outer rocker panel, and is fixed to the outer pillar and rocker panels by welding methods, resulting in the increased rigidity of the entire side door supporting mechanism.

7 Claims, 11 Drawing Figures

REINFORCED SIDE DOOR SUPPORT STRUCTURE

BACKGROUND OF THE INVENTION

The present invention relates to a vehicle body structure associated with a passenger door, and more particularly to an improved vehicle body structure which increases the rigidity of a pillar and rocker panel, door supporting mechanism which swingably supports a side door utilized by a passenger for entering and exiting the vehicle, with the rocker panel intersecting the lower portion of the pillar.

FIG. 1, shows a side door 1 swingably supported on a pillar 4 of a vehicle body by the upper and lower hinges 2 and 3 respectively, a door check mechanism 13 for regulating the movement of the door 1, which is fixed to the inside of the side door 1 at its one end and a bracket 16 mounted on the pillar 4 at its other end, a door check arm 14 extends between the door 1 and the pillar bracket 16, and a rocker panel 6 extends longitudinally along the vehicle from the lower portion of the pillar 4 toward the rear of the vehicle.

Previously known vehicle body structures comprise a side door 1 installed into the opening defined by a pillar 4 and a rocker panel 6. The weight of the door 1 is relatively large therefore, a reinforcement member is provided on the lower part of the pillar 4, around the lower door hinge 3 to provide added support. A similar mechanism is disclosed in Japanese laid open utility model No. Sho 52-85215. However, when a vehicle traverses a surface, vibrations are transmitted from the road surface to the vehicle, resulting in various parts of the vehicle vibrating, including the door member. The vibrations become particularly prevalent at high operating speeds and/or rough road conditions. The known reinforcements for the door supporting mechanism have not been adequate to prevent the door from vibrating because of their insufficient rigidity.

SUMMARY OF THE INVENTION

The present invention was made in view of the foregoing background and to overcome the foregoing drawbacks. It is accordingly, an object of this invention to provide an improved vehicle body structure wherein the rigidity of the door supporting member is improved, thus reducing the vibrations in the door of the vehicle.

To attain the above objects, a vehicle body and pillar-rocker panel reinforcement structure according to the present invention, comprises:

a side door for a passenger's entering and exiting the vehicle;

a door check mechanism fixed to the side of the door at one end thereof;

a pillar which swingably supports the side door, having an inner pillar panel and an outer pillar panel which are fixed together;

a flange provided in the outer pillar panel for fixing the outer pillar panel to the inner pillar panel thereby;

a bracket fixed to the outer pillar panel;

a door check arm extending between the door check and the bracket;

a rocker panel fixed to the pillar, the panel having,
an inner rocker panel fixed to the inner pillar panel,
an outer rocker panel fixed to the outer pillar panel and the inner rocker panel, and
a flange fixing the inner rocker panel to the outer rocker panel; and
a reinforcement member connecting the pillar with the rocker panels, the member comprising,
a front wall fixed to the inside of the outer pillar panel, and
an extended skirt portion sandwiched between the flanges of the pillar panel and the outer rocker panel.

BRIEF DESCRIPTION OF THE DRAWINGS

The above objects, features and advantages of the present invention will become more apparent from reading the following description of the preferred embodiments taken in conjunction with the accompanying drawings wherein.

DETAILED DESCRIPTION OF THE PREFERRED EMBODIMENTS

The present invention is described in detail with reference to the accompanying drawings which illustrate a vehicle body structure according to the present invention.

Figure 1:
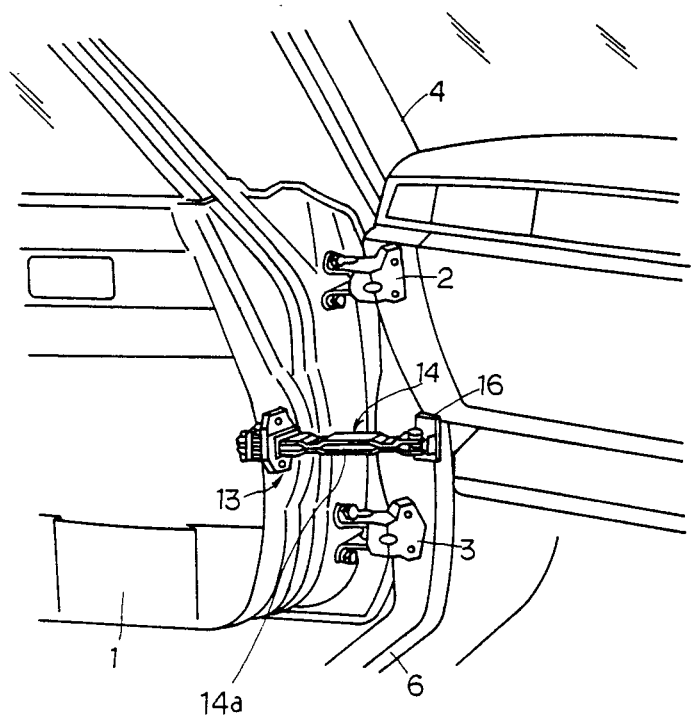
FIG. 1 is a general perspective view illustrating a vehicle body structure according to the present invention.
Figure 9:
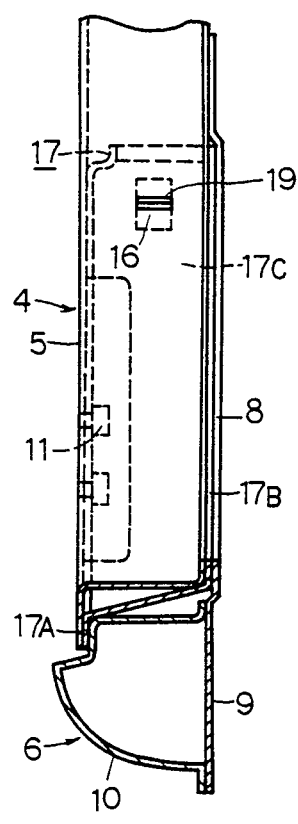
FIG. 9 is a cross-sectional view taken along the line IX—IX of FIG. 8.
Figure 10:
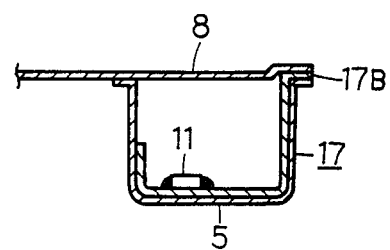
FIG. 10 is a cross-sectional view taken along the line X—X of FIG. 8.
Figure 11:
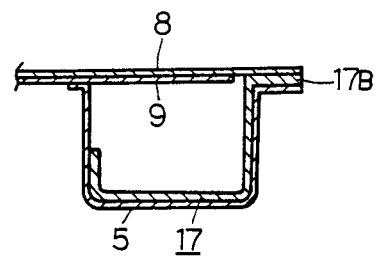
FIG. 11 is a cross-sectional view taken along the line XI—XI of FIG. 8.

FIGS. 1 through 5 illustrate a first embodiment of the present invention. FIG. 1 shows a door check mechanism 13 provided between a side door 1 and a pillar 4. The door check mechanism 13 regulates the amount that the side door 1 opens. One end of the door check mechanism is attached to the side door 1 and the other end is attached to the pillar 4 through the bracket 16. The check arm 14 has an intermediate portion 14a which slides and extends through a slit 19 formed in the side face of the outer pillar panel 5, as shown in FIG. 9.

Figure 2:
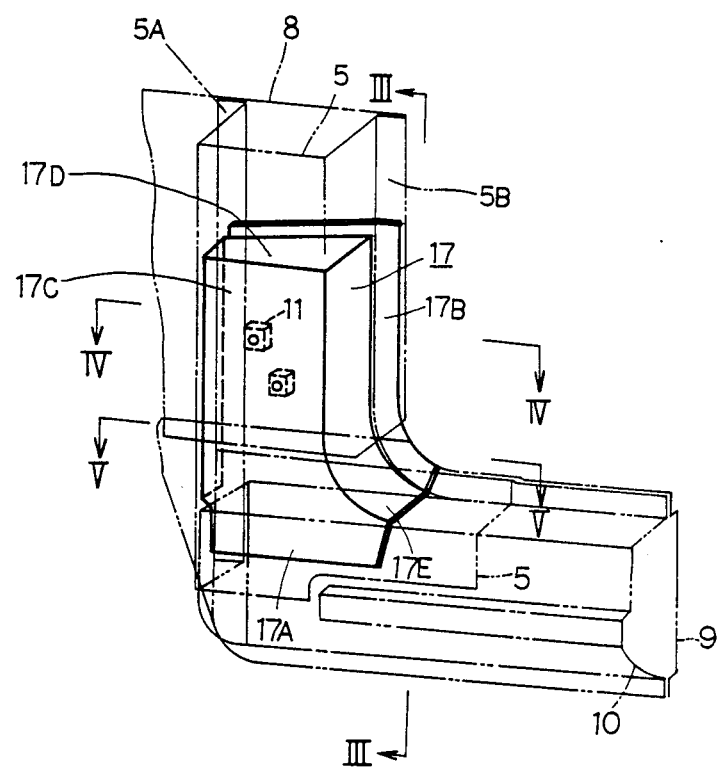
FIG. 2 is a perspective view illustrating a first embodiment of the present invention.

The pillar 4, which swingably supports the side door 1 comprises an inner panel 8 and an outer panel 5 which vertically extends in the vehicle (note that the left side of FIG. 2 corresponds to the forward portion of the vehicle). The outer pillar panel 5 has inner flanges 5A and 5B, as shown in FIGS. 4 and 5, which are fixed to the inner pillar panel 8 by welding techniques. The outer pillar panel 5 has a stepped portion 5C included in its lower vertical portion, as shown in FIG. 3.

A welded nut 11 is fixed to a hinge reinforcement member for receiving a bolt therein, resulting in the lower door hinge 3 being fixed therewith. The front portion of the rocker panel 6 comprising an inner rocker panel 9 and an outer rocker panel 10 is located under the pillar 4, thereby forming a closed section which is connected with the floor of a vehicle body. FIG. 3 shows that the outer rocker panel 10 has a stepped portion 10C, wherein the stepped portion 5C of the outer pillar panel 5 is fixed to the outer rocker panel 10 by welding techniques. A hinge reinforcement member 17 is provided around the welded nut 11. The outer rocker panel 10 has inner flanges 10A and 10B which are fixed to the inner rocker panel 9 by welding techniques. FIGS. 3 and 5 show that the upper portion of the inner rocker panel 9 is fixed to the lower portion of the inner pillar panel 8 by welding techniques. Thus, the rocker panel 6 is connected with the pillar 4.

Figure 3:
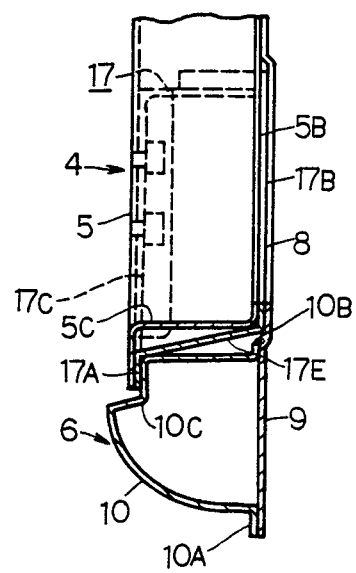
FIG. 3 is a cross-sectional view taken along the line III—III in FIG. 2.
Figure 4:
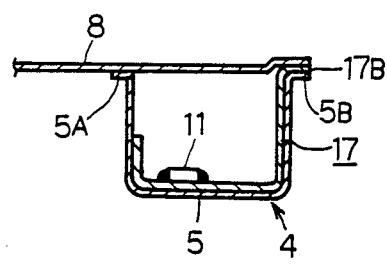
FIG. 4 is a cross-sectional view taken along the line IV—IV in FIG. 2.
Figure 5:
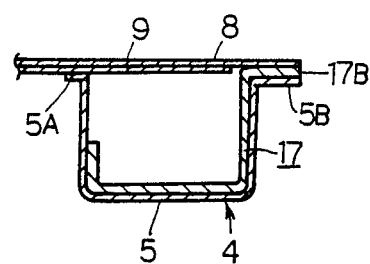
FIG. 5 is a cross-sectional view taken along the line V—V in FIG. 2.

As disclosed in FIGS. 3 through 5, the hinge reinforcement member 17 comprises a main wall 17C extending vertically in the vehicle and fixed to the inside of the outer pillar panel 5, a flange 17B also extending vertically in the vehicle and fixed to the inner pillar panel 8 by welding techniques, and a skirt 17A. An end wall 17D is provided at the upper end of the hinge reinforcement member 17 in a position above the welded nut 11. The upper cross-section of the hinge reinforcement member 17 is rectangular, as shown in FIG. 2. The extended skirt portion 17A is sandwiched between the lower portion of the outer pillar panel 5 and the stepped portion 10C of the outer rocker panel 10, and fixed to each portion respectively. The lower portion of the flange 17B is connected to the extended skirt 17A by the sidewall 17E. The flange 17B of the reinforcement member 17 is sandwiched between the inner flange 5B of the outer pillar panel 5 and the lower portion of the inner pillar panel 8 and fixed thereto by welding techniques.

Figure 6:
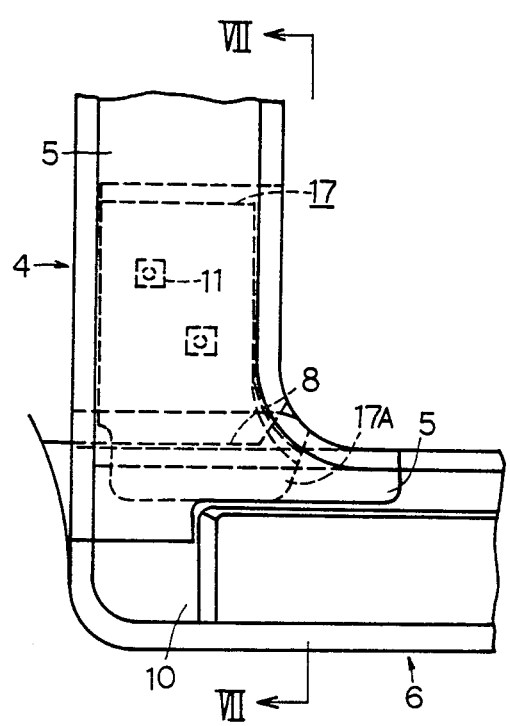
FIG. 6 is a side view illustrating a second embodiment of the present invention.
Figure 7:
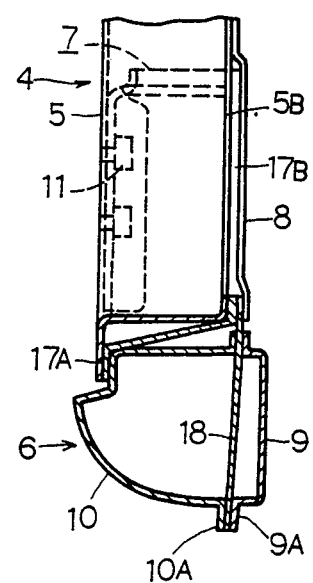
FIG. 7 is a cross-sectional view taken along the line VII—VII in FIG. 6.
Figure 8:
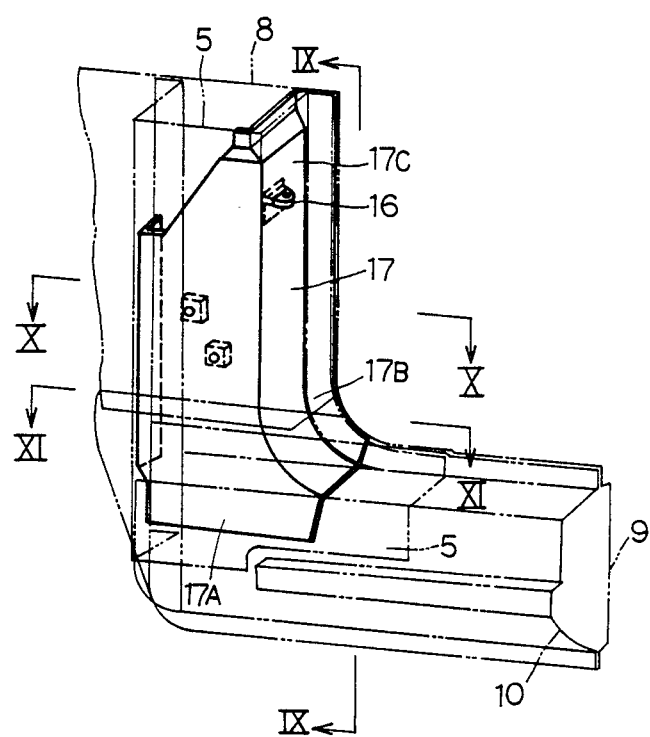
FIG. 8 is a perspective view showing a third embodiment of the present invention.

Referring next to FIGS. 6 and 7, a second embodiment of the present invention is illustrated. The difference between the first embodiment disclosed in FIGS. 2 through 5 and the second embodiment disclosed in FIGS. 6 and 7 is that an additional reinforcement member 18 is provided in the rocker panel 6. The upper portion of the reinforcement member 18 is sandwiched among and fixed to the inner flange 5B of the outer pillar panel 5, the flange 17B of reinforcement member 17 and the inner pillar panel 8 by welding techniques. The lower portion of the support member 18 is sandwiched between and fixed by welding techniques to the flange 10A of the outer rocker panel 10 and a flange 9A of the inner rocker panel 9. In this second embodiment, the upper portion of the reinforcement member 18 extends to the lower portion of the inner pillar panel 8 instead of the inner rocker panel 9 extending to the said panel as disclosed in a first embodiment of the present invention.

FIGS. 8 through 11 disclose a third embodiment of the present invention. The member 17 reinforces the area around the door check bracket 16 in addition to the area around the lower door hinge 3. The difference between the first embodiment disclosed in FIGS. 2 through 5 and the third embodiment disclosed in FIGS. 8 through 11 is that the hinge reinforcement member 17 vertically extends to a higher position than that disclosed in the first embodiment, thereby supporting the bracket 16 of the door check arm 14.

The aforementioned hinge reinforcement member 17 is provided to increase the rigidity of the vehicle body structure with particular attention given to the areas where the hinges of the door are attached. Hence, the connection between the lower portion of the pillar 4 and the rocker panel 6 is strengthened by the reinforcement member 17. Further, in accordance with the second embodiment in FIGS. 6 and 7, a reinforcement member 18 is provided within the rocker panel 6 and attached to the pillar mechanism 4. Therefore, in addition to the increase of the rigidity of the rocker panel 6 itself, the connection between the lower portion of the pillar 4 and the rocker panel 6 is further strengthened because the reinforcement member 18 is welded to the inner pillar panel 8.

While the present invention has been described in its preferred embodiments, it is to be understood that the invention is not limited thereto and may be otherwise embodied within the scope of the following claims.

What is claimed is:

1. A vehicle body and pillar-rocker panel reinforcement structure comprising:
    a pillar having an inner pillar panel and an outer pillar panel, said outer pillar panel having inner edges which are fixed to the inner pillar panel;
    a rocker panel including an inner rocker panel and an outer rocker panel, said outer rocker panel having inner edges which are fixed to the inner rocker panel and said inner rocker panel is fixed to said inner pillar panel and said outer rocker panel is fixed to said outer pillar panel;
    a reinforcement member for reinforcing the pillar, said reinforcement member being located within a lower portion of said pillar and including a main wall fixed on an inner surface of said outer pillar panel, a skirt portion of said main wall fixed to the outer rocker panel, and an end wall fixed to the main wall at one end thereof and fixed to said inner pillar panel at another end thereof, thereby defining a substantially closed chamber within said lower portion of the pillar between the main wall of said reinforcement member, the end wall of said reinforcement member, the outer rocker panel, the outer pillar panel and the inner pillar panel; and
    a side door supported swingably on said lower portion of said pillar.

2. The vehicle body structure of claim 1, wherein the reinforcement member further comprises:
    an inner flange sandwiched between the inner pillar panel and at least one inner edge of the outer pillar panel, the inner flange being fixed to each of the inner pillar panel and outer pillar panel; and
    a side wall connecting the inner flange with the skirt portion.

3. The vehicle body structure of claim 1, wherein the reinforcement member further comprises a door check bracket for fixing a door check arm thereto.

4. A vehicle body and pillar-rocker panel reinforcement structure comprising:
    a pillar having an inner pillar panel and an outer pillar panel, said outer pillar panel having inner edges which are fixed to the inner pillar panel;
    a rocker panel including an inner rocker panel and an outer rocker panel said outer rocker panel being fixed to the outer pillar panel;
    a first reinforcement member for reinforcing the rocker panel, said first reinforcement member being fixed to the inner and outer rocker panels and extending therethrough such that said first reinforcement member is also fixed to the inner pillar panel;

a second reinforcement member for reinforcing the pillar, said second reinforcement member being located within a lower portion of said pillar and including a main wall fixed on an inner surface of said outer pillar panel, a skirt portion of said main wall fixed to the outer rocker panel, and an end wall fixed to the main wall at one end thereof and fixed to said inner pillar panel at another end thereof, thereby defining a box-like area within said lower portion of the pillar between the main wall of said second reinforcement member, the end wall of said second reinforcement member, the outer rocker panel, the outer pillar panel and the inner pillar panel; and a side door supported swingably on said lower portion of said pillar.

5. The vehicle body structure of claim 4, wherein said first reinforcement member is sandwiched between said inner rocker panel and said outer rocker panel.

6. The vehicle body structure of claim 5, wherein said first reinforcement member is sandwiched between top and bottom portions of said inner rocker panel and said outer rocker panel.

7. The vehicle body structure of claim 4, wherein the second reinforcement member further comprises a door check bracket for fixing a door check arm thereto.

* * * * *